United States Patent
Kawamoto et al.

(10) Patent No.: US 7,379,745 B2
(45) Date of Patent: May 27, 2008

(54) PATH SEARCHER AND PATH SEARCHING METHOD

(75) Inventors: Junichiro Kawamoto, Yokohama (JP); Noriyuki Maeda, Yokohama (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 456 days.

(21) Appl. No.: 11/121,973

(22) Filed: May 5, 2005

(65) Prior Publication Data

US 2005/0255819 A1  Nov. 17, 2005

(30) Foreign Application Priority Data

May 13, 2004  (JP)  ............... 2004-144180

(51) Int. Cl.
*H04B 15/00*  (2006.01)

(52) U.S. Cl. .......... 455/506; 455/65; 455/273

(58) Field of Classification Search ........ 455/504, 455/506, 65, 550.1, 562.1, 272, 273, 67.16; 375/148, 150, 347

See application file for complete search history.

(56) References Cited

U.S. PATENT DOCUMENTS

2001/0050950 A1 * 12/2001 Sato ............... 375/150
2007/0110138 A1 * 5/2007 Wang et al. ........... 375/148

FOREIGN PATENT DOCUMENTS

| EP | 1 126 626 A2 | 8/2001 |
| EP | 1 162 757 A2 | 12/2001 |
| JP | 2001-217747 | 8/2001 |
| WO | WO 2004/102825 A1 | 11/2004 |

* cited by examiner

*Primary Examiner*—Nguyen T. Vo
(74) *Attorney, Agent, or Firm*—Oblon, Spivak, McClelland, Maier & Neustadt, P.C.

(57) ABSTRACT

A path searcher used in a receiver includes a power delay profile generating unit configured to generate a power delay profile based on a signal received by the receiver, a sidelobe generating unit configured to identify a sidelobe component of a path contained in the power delay profile based on a response characteristic of a band-limiting filter of the receiver, a sidelobe removing unit configured to remove the sidelobe component from the power delay profile to produce a corrected power delay profile, and a path timing detection unit configured to detect a path timing based on the corrected power delay profile.

11 Claims, 8 Drawing Sheets

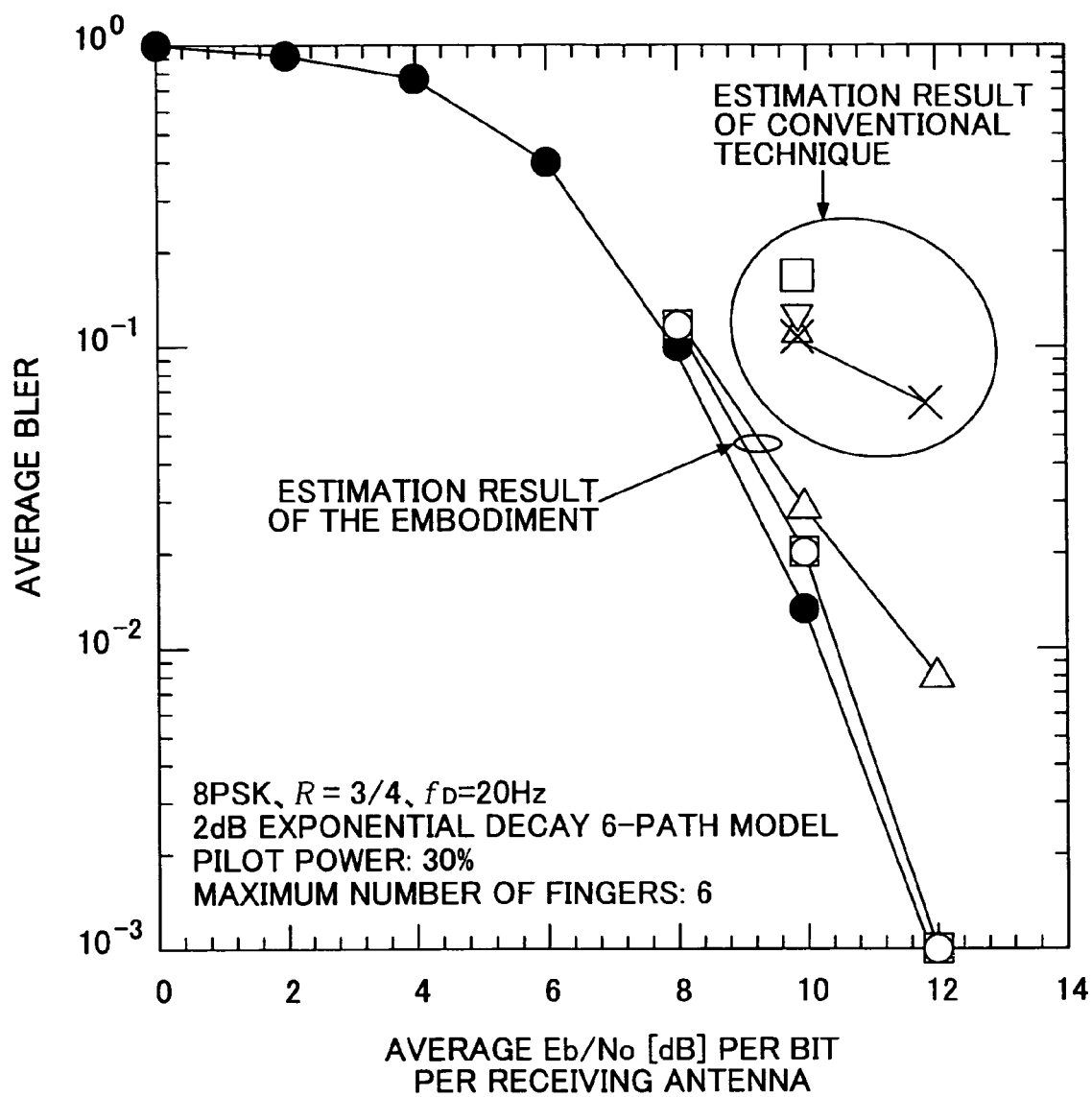

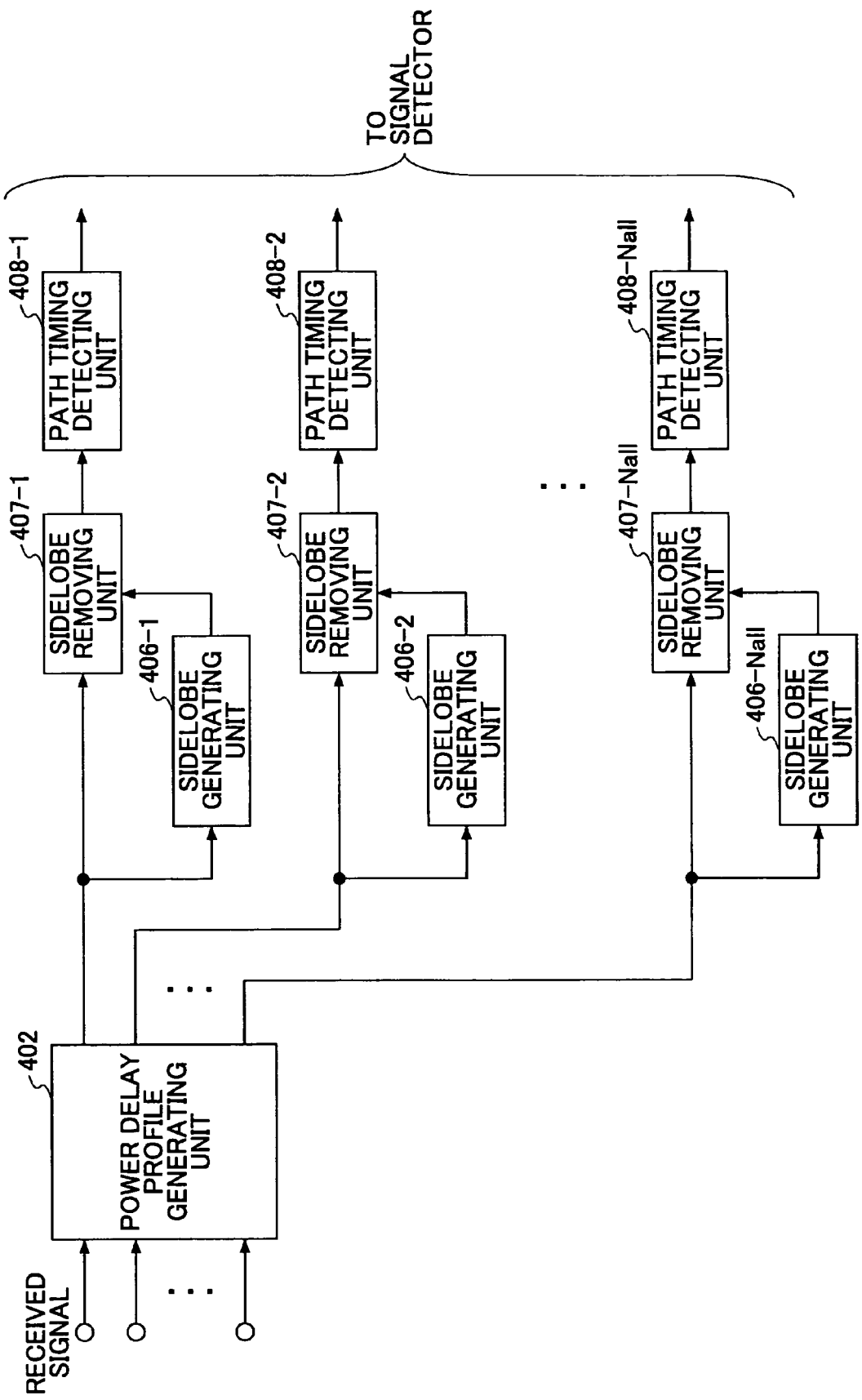

PATH SEARCHER AND PATH SEARCHING METHOD

FIELD OF THE INVENTION

The present invention generally relates to a wireless communication technique, and more particularly to a path searcher and a path searching method based on a power delay profile.

BACKGROUND OF THE INVENITON

In general, a signal transmitted from a wireless transmitter reaches a wireless receiver as direct wave. In addition to or in place of the direct wave, one or more reflected waves reflected from buildings, obstacles, or the earth also reach the wireless receiver. The direct wave and/or the reflected waves constitute a series of arriving waves standing on the time axis, which then define a multi-path power delay profile. By accurately distinguishing the amplitudes and the timings of these paths, the original signal transmitted from a wireless transmitter can be restored to a satisfactory degree in wireless telecommunications.

Path timing in the power delay profile is detected using a technique called "path search". In conventional path search, the threshold based on noise level is set to a certain level, and a path is detected based on whether the power level of the path exceeds the threshold based on the noise level. An example of the conventional path search technique is disclosed in JP 2001-217747A.

However, some of the path candidates appearing in the power delay profile arise from the sidelobe component of the path, differing from the true path timing. For example, when a path with relatively large power passes through a roll-off filter, the sidelobe component of this path is produced, and this sidelobe component may appear in the power delay profile. Such a sidelobe component may be neglected in conventional use or products; however, in future application to high-performance products, the sidelobe component may degrade the accuracy of path search. It is difficult to remove such an unnecessary path component by adjusting the threshold based on the noise level because if the threshold based on the noise level is set too low, many sidelobe components are picked up as true path components, while if the threshold based on the noise level is set too high, not only unnecessary path components, but also true path components are removed. In such a case, sidelobe components with a power level equivalent to that of true path components exist in the power delay profile.

Meanwhile, in multiple-input multiple-output (MIMO) systems designed to achieve high communication capacity, multiple transmission antennas and multiple receiving antennas are employed in a transmitter/receiver. Accordingly, multipath interference occurs not only in a propagation path from a transmission antenna 206-$p$ to a certain receiving antenna 208-$x$, but also in a path from another transmission antenna 206-$q$ to the receiving antenna 208$x$, as illustrated in FIG. 1 and FIG. 2. In a MIMO system, as the number of antennas increases, the path candidates also increase and a highly accurate path search is required. At the same time, degradation of path search accuracy is a concern.

SUMMARY OF THE INVENTION

The present invention was conceived in view of the above-described problems, and it is an object of the present invention to provide a path searcher and a path searching method that can remove sidelobe components of a path, which components are produced when a received signal passes through a band-limiting filter, from the power delay profile to correctly detect the true path.

To achieve the object, a power delay profile is created based on a received signal, and the sidelobe component of the path is calculated from the response characteristic of the band-limiting filter. The sidelobe component is removed from the power delay profile to produce a corrected power delay profile, and path timing is detected from the corrected power delay profile.

In one aspect of the invention, a path searcher includes:
(a) a power delay profile generating unit configured to generate a power delay profile based on a received signal;
(b) a sidelobe component determination unit configured to identify a sidelobe component using the response characteristic of a band-limiting filter;
(c) a power delay profile correction unit configured to remove the sidelobe component from the power delay profile to correct the power delay profile; and
(d) a path timing detecting unit configured to detect path timing based on the corrected power delay profile.

In another aspect of the invention, a path searching method is provided. The path searching method includes the steps of:
(a) creating a power delay profile based on a received signal;
(b) selecting a path with a power level exceeding a threshold level;
(c) identifying the sidelobe component of the selected path based on the response characteristic of a band-limiting filter;
(d) removing the sidelobe component from the power delay profile to produce a corrected power delay profile; and
(e) detecting path timing based on the corrected power delay profile.

With the path searcher and the path searching method, the sidelobe component of the path produced when the received signal passes through a band-limiting filter, which cannot be removed by simply adjusting the threshold based on the noise level, is removed from the power delay profile efficiently. Accordingly, accurate and reliable path detection can be performed.

If the above-described path searching technique is applied to a MIMO system, the power delay profile may be created for each of the combinations of a transmission antenna and a receiving antenna (each propagation path defined by the transmission path and the receiving path).

In this case, multiple power delay profiles may be combined into a single profile by, for example, averaging the power delay profiles. The sidelobe of the path may be calculated from the averaged power delay profile. When detection and removal of the sidelobe component are performed based on the averaged power delay profile, the amount of arithmetic operations required for signal detection can be reduced because path timings based on the averaged power delay profile are given to the subsequent signal detecting process. If priority is given to precision in the signal detection, it is desired to correct each of the power delay profiles created for the multiple propagations paths, instead of averaging the power delay profiles.

BRIEF DESCRIPTION OF THE DRAWINGS

Other objects, features, and advantages of the invention will become more apparent from the following detailed description when read in conjunction with the accompanying drawings, in which

FIG. 8 is a graph showing the simulation result of the embodiment in comparison with the conventional technique; and FIG. 9 is a block diagram of the path searcher used in the MIMO receiver according to another embodiment of the invention.

DETAILED DESCRIPTION OF THE PREFERRED EMBODIMENT

The present invention is described in detail below in conjunction with the attached drawings.

Figure 1:
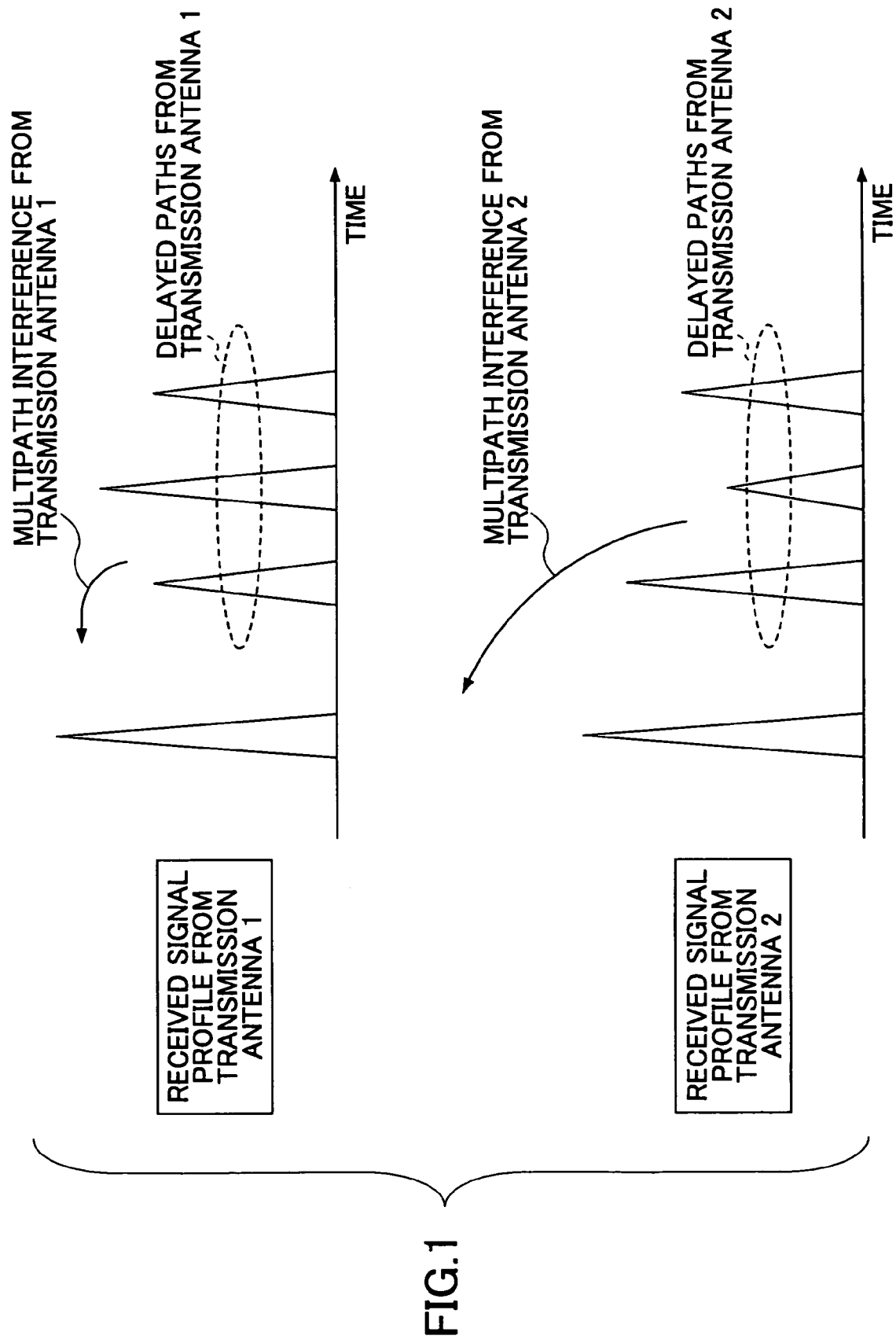
FIG. 1 is a schematic diagram illustrating power delay profiles.
Figure 2:
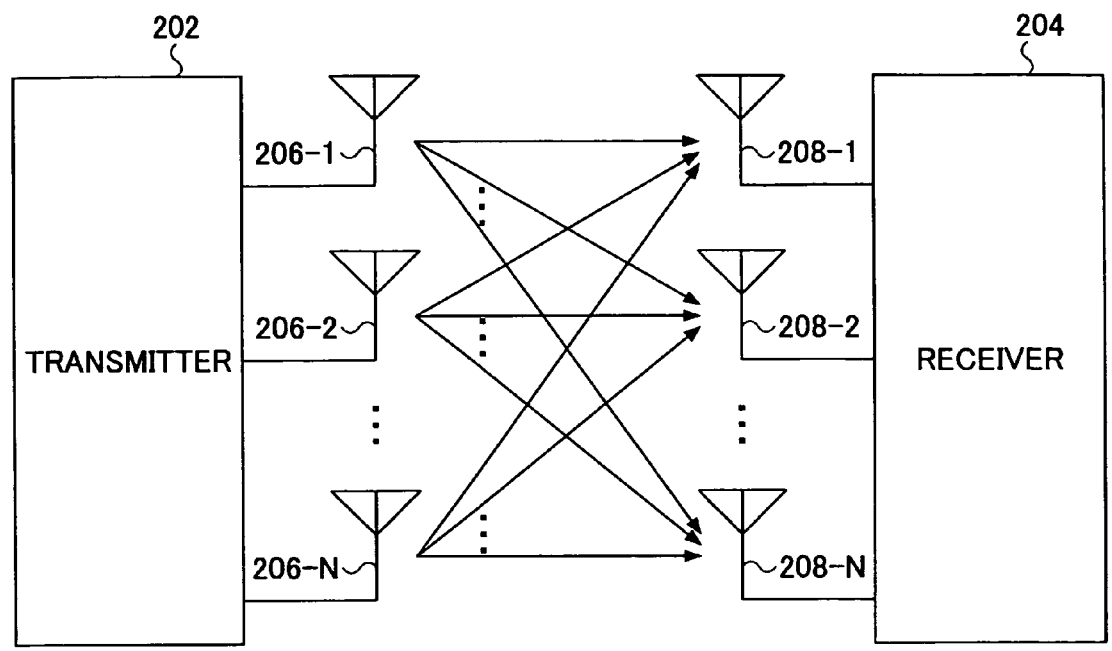
FIG. 2 is a schematic diagram illustrating a MIMO wireless communication system.

FIG. 2 is a schematic diagram of a multiple-input multiple-output (MIMO) communication system that includes a transmitter 202 and a receiver 204. The MIMO system used in the embodiment is a spatial-multiplexed MIMO system, and individual signals are transmitted simultaneously from the transmission antennas 206-1 through 206-N at the same frequency. The invention may be applied to a MIMO diversity system in which signals with substantially the same contents are transmitted from the transmission antennas at the same time. The multiple signals transmitted from the transmission antennas 206-1 through 206-N are received at multiple receiving antennas 208-1 through 208-N. In this example, the number of transmission antennas and the number of receiving antennas are the same (N antennas) for purposes of simplification. However, the number of antennas may be different between the transmission antennas and the receiving antennas.

Figure 3:
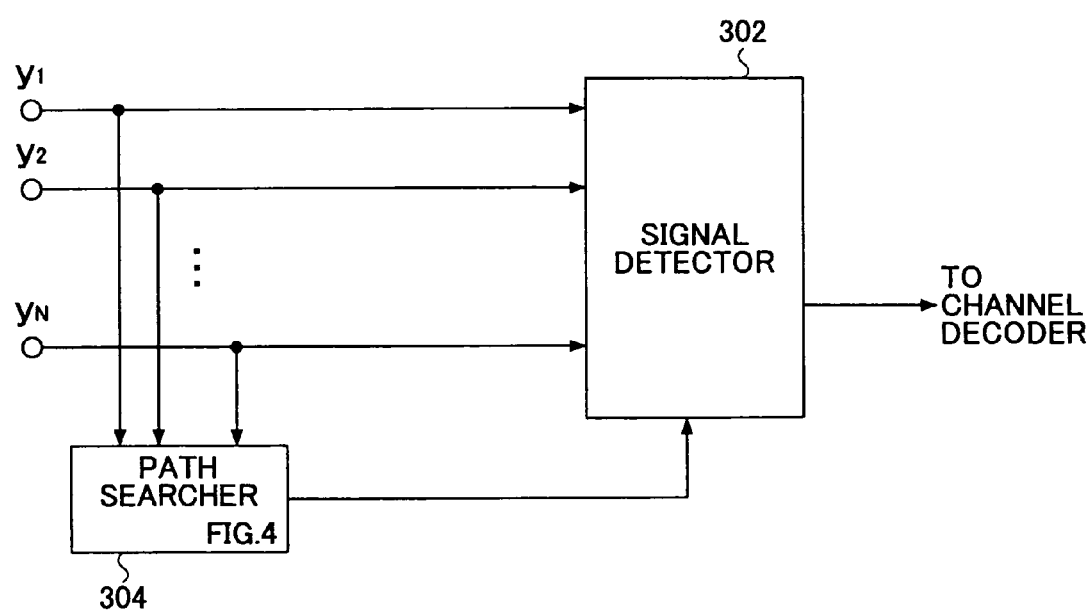
FIG. 3 is a schematic diagram of a MIMO receiver.

FIG. 3 is a schematic diagram of the receiver 204 shown in FIG. 2. Received signals $y_1$-$y_N$ received at the respective receiving antennas are input to the signal detection unit 302. The received signals $y_1$-$y_N$ are also input to the path searcher 304. The path searcher estimates a channel based on the received signal containing a pilot signal known by both the transmitter 202 and the receiver 204, creates a power delay profile, and supplies information about path timings and fading compensation to the signal detection unit 302.

The signal detection unit 302 detects and separates from one another the signals transmitted from the multiple transmission antennas 206-1 through 206-N one another, based on the received signal and the estimated path timings. The signal separation may be performed using minimum mean square error (MMSE), maximum likelihood detection (MLD), or maximum likelihood detection with QR decomposition and M-algorithm (QRM-MLD). The separated signals are supplied to a channel decoder for the subsequent decoding process.

Figure 4:
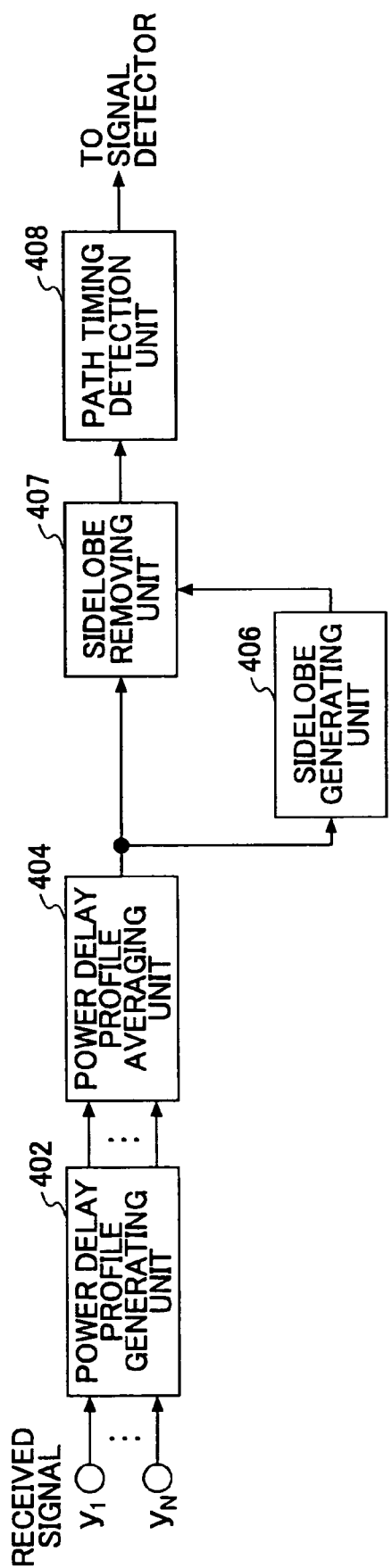
FIG. 4 is a block diagram of the path searcher used in the MIMO receiver according to an embodiment of the invention.

FIG. 4 is a functional block diagram of the path searcher 304 according to an embodiment of the invention. The path searcher 304 includes a power delay profile generating unit 402, a power delay profile averaging unit 404, a sidelobe generating unit 406, a sidelobe removing unit 407, and a path timing detection unit 408.

The power delay profile generating unit 402 generates multiple power delay profiles based on the received signals $y_1$-$y_N$ received at the receiving antennas 208-1 through 208-N and having been subjected to the band limiting processing. To be more precise, the power delay profile generating unit 402 performs channel estimation for each combination of a transmission antenna 206 and a receiving antenna 208, based on the received pilot signal, examines the power level and the timing of the path contained in the received signal, and outputs an information item as to the power delay profile. Accordingly, the power delay profile generating unit 402 generates $N_{TX}*N_{RX}$ power delay profiles, where $N_{TX}$ denotes the number of transmission antennas 206, and $N_{RX}$ denotes the number of receiving antennas 208. In the MIMO system, the signal received at a receiving antenna 208 includes signals from $N_{TX}$ transmission antennas 206. The $N_{TX}*N_{RX}$ combinations of the transmission antenna 206 and the receiving antenna 208 can be distinguished from each other by making use of the pilot signals different among the transmission antennas 206-1 through 206-N. It is preferable to select pilot signals so as to be orthogonal to each other.

The power delay profile averaging unit 404 combines the multiple power delay profiles created by the power delay profile generating unit 402 into a single profile, while appropriately timing the multiple power delay profiles. The power delay profiles can be combined generally by averaging, such as arithmetic averaging or weighted arithmetic averaging. To this end, the power delay profile averaging unit 404 is an example of power delay profile combining means.

Figure 5:
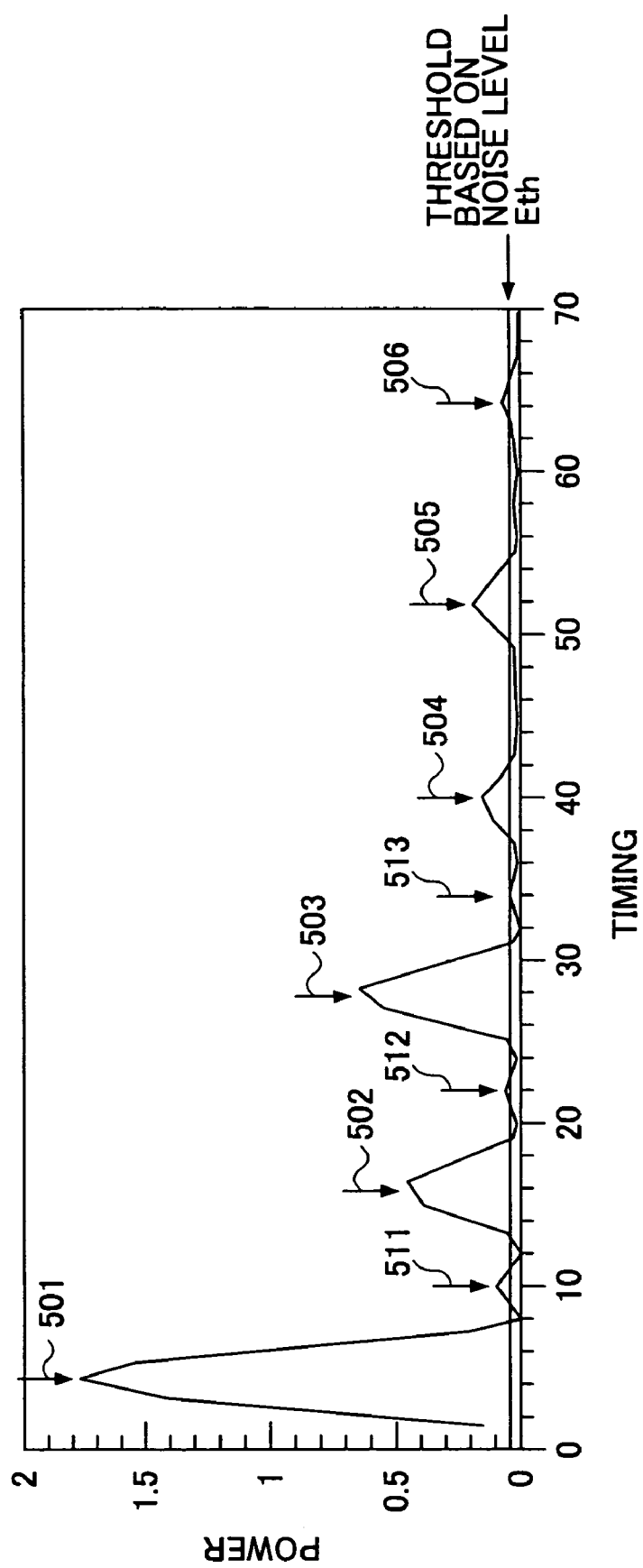
FIG. 5 is a graph illustrating a combined power delay profile.

FIG. 5 is a chart showing an example of the combined power delay profile. This power delay profile includes nine paths (indicated by the downward arrows) with power levels exceeding the threshold based on the noise level Eth. Among these nine paths, six paths 501-506 are true paths, while three paths 511-513 are likely to be the sidelobe components of the true paths for which components the actual channel may not exist. If the sidelobe components are detected incorrectly as true paths, accuracy of signal separation performed at the signal detection unit 302 in the subsequent process may be degraded, and satisfactory signal restoration may become difficult. The sidelobe components are produced when a path with a relatively high power level passes through a roll-off (band-limiting) filter.

Figure 6:
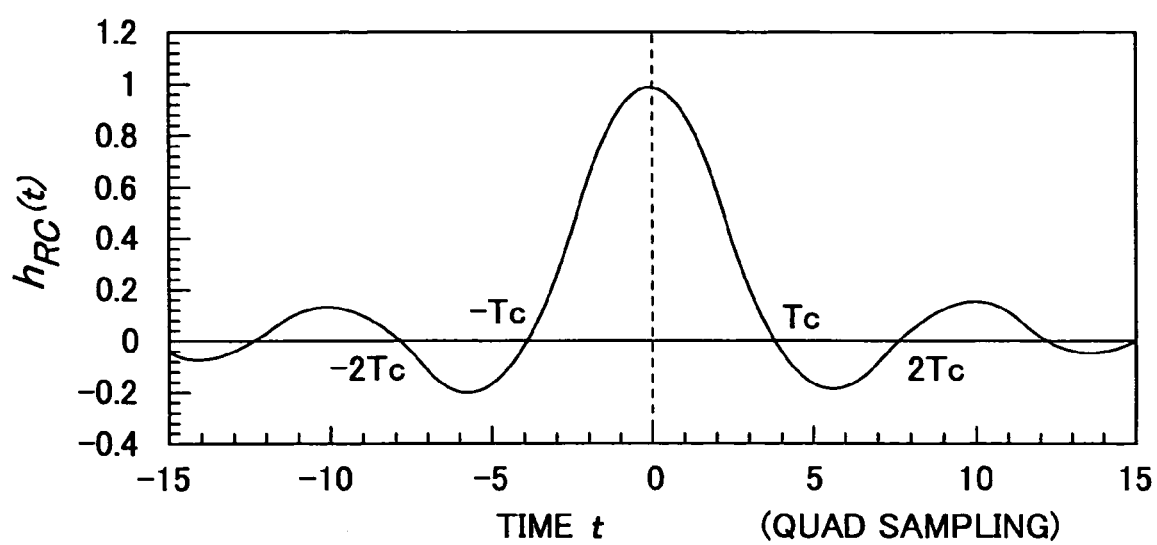
FIG. 6 is a graph of the impulse response characteristic of the roll-off filter.

The sidelobe generating unit 406 shown in FIG. 4 generates the sidelobe components appearing in the power delay profile, making use of the impulse response characteristic of the roll-off filter (band-limiting filter). The impulse response characteristic $h_{RC}(t)$ of the roll-off filter is known in the receiver 204. The impulse response characteristic $h_{RC}(t)$ has a characteristic shown in FIG. 6, for example, and is expressed by Equation (1).

$$h_{RC}(t) = \left(\frac{\sin(\pi t/Tc)}{\pi t/Tc}\right)\left(\frac{\cos(\pi\alpha t/Tc)}{1-(4\alpha t/(2Tc))^2}\right) \quad (1)$$

where Tc denotes the chip period, and α denotes the roll-off factor. In the example shown in FIG. 6, α is set to 0.22 (α=0.22). In general, the portion within the range from a negative chip period to a positive chip period (|t|≦Tc) is called a main lobe directed to the true path, and the other portion in the range |t|>Tc is directed to the sidelobe.

For example, based on the power level and the timing of the first-arriving path 501 shown in FIG. 5, the power level and the timing of the sidelobe of this path can be calculated from Equation (1). Based on the power level and the timing of the second-arriving path 502, the sidelobe of the path 502 is determined using Equation (1). Similarly, paths with a relatively large power level (for example, Y paths) are selected, and the sidelobe component of each of the selected paths is determined. There are a number of sidelobe components in theory, and a necessary number of sidelobe components (for example, Z sidelobe components on either side of the main lobe) are selected according to the use. The power levels and the timings of the selected sidelobe components are determined for each path. The paths for which the sidelobe components are calculated may be selected in descending order of the power level (for example, Y paths with Y highest power levels) from among those paths with a power level exceeding a threshold level.

The sidelobe removing unit 407 shown in FIG. 4 removes the sidelobe components identified by the sidelobe generating unit 406 from the power delay profile produced by the power delay profile averaging unit 404. Consequently, undesired paths 511, 512, and 513 are removed from the power delay profile shown in FIG. 5, and six true paths 501-506 remain in the power delay profile.

The path timing detection unit 408 extracts path timings based on the power delay profile corrected by the sidelobe removing unit 407. In the example shown in FIG. 5, six paths 501-506 are extracted through comparison between the path power level and the threshold based on the noise level Eth.

In this manner, the path searcher 304 of the present embodiment performs path search based on the power delay profile from which undesired path components have been removed, and accordingly, accurate path search can be realized.

Figure 7:
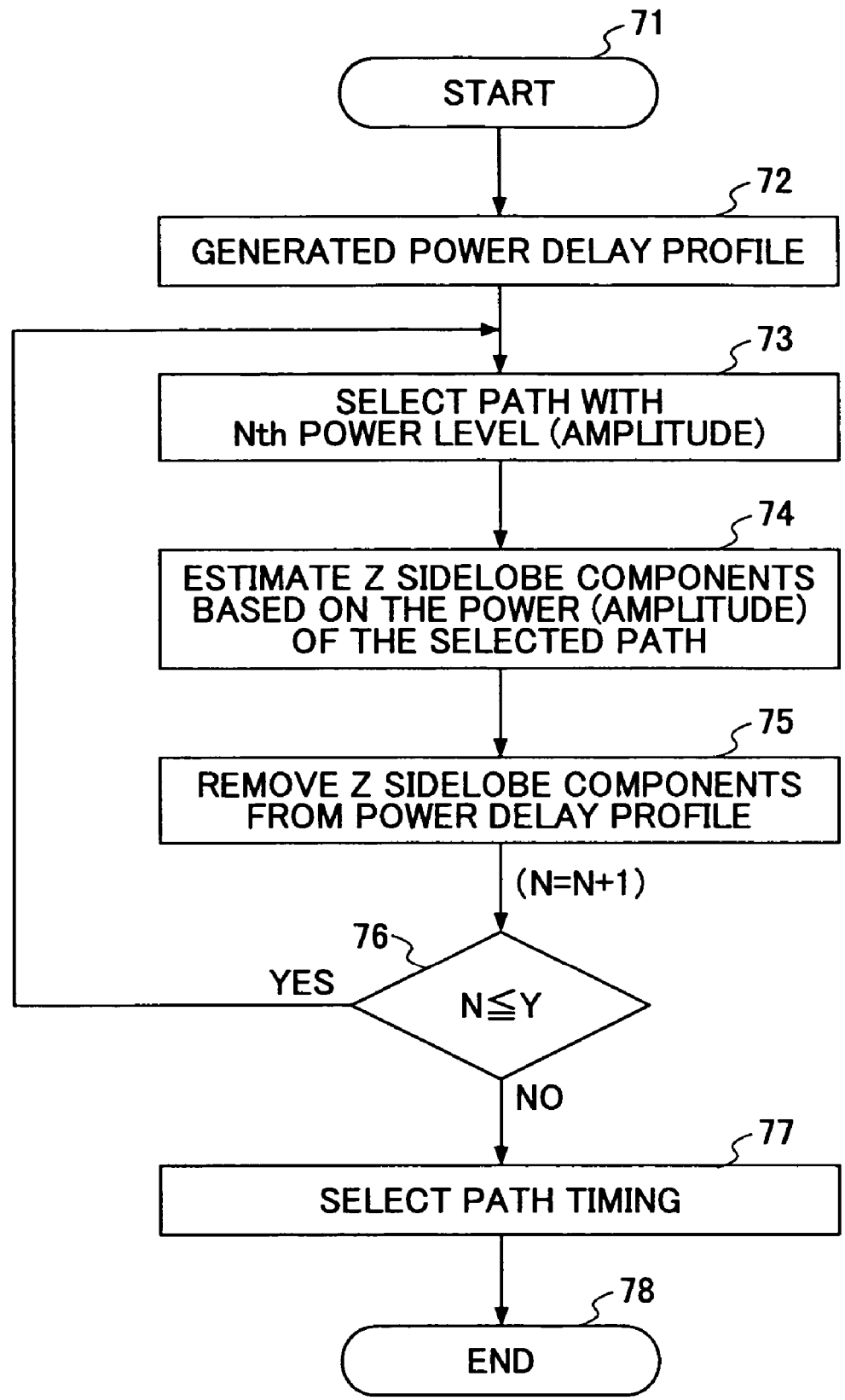
FIG. 7 is a flowchart showing the operations of the path searcher according to an embodiment of the invention.

FIG. 7 is a flowchart showing the operations carried out by the path searcher 304 according to an embodiment of the invention. The flow illustrates the example of selecting top Y paths from the power delay profile. The process starts in step 71. In step 72, a power delay profile is generated at the power delay profile generating unit 402 shown in FIG. 4, based on the received signal, for each of the combinations of a transmission antenna and a receiving antenna in the MIMO system. Then, the generated multiple power delay profiles are combined into a single power delay profile through arithmetic averaging, weighted averaging, or other suitable methods.

In step 73, a path with the $N^{th}$ highest power level is selected from among the multiple paths included in the combined power delay profile. The initial value of parameter N is set to one (N=1).

In step 74, based on the timing and the power level of the selected path, a prescribed number of (Z, for example) sidelobe components are calculated by the sidelobe generating unit 406, making use of the response characteristic of the roll-off (or band-limiting) filter expressed as Equation (1).

In step 75, the Z identified sidelobe components are removed from the combined power delay profile of the selected path (the $N^{th}$ highest path) by the sidelobe removing unit 407, and the parameter N is incremented.

In step 76, it is determined whether N is less than or equal to Y (N≦Y). If N is less than or equal to Y (Y is in step 76), the process returns to step 73, the next path having a next largest power level is selected, and steps 74-76 are repeated. If, in step 76, N is greater than Y, then the process proceeds to step 77. At this point of time, the power delay profile has been corrected so as to include the main lobe components of the Y largest paths, as well as the main lobe components and the sidelobe components of the smaller paths, and not includes the sidelobe components of the Y largest paths.

In step 77, the power levels and the timings of the Y largest paths and the other paths are determined based on the corrected power delay profile, and the process terminates in step 78.

FIG. 8 is a chart showing a simulation result of the path search according to the embodiment, in comparison with the conventional technique. The conditions set in the simulation are as follows:

Modulation Scheme: 8PSK
Turbo Coding Rate R: ¾
Maximum Doppler Frequency $f_D$: 20 Hz
Pilot Power Ratio to Data channel: 30%
Maximum Number of Fingers: 6.

In simulation, a 2-dB exponential delay 6-path signal model is employed, and the power level is attenuated by 2 dB at each path of the second and the subsequent paths. The horizontal axis of the chart represents signal-to-noise average power density ratio (Eb/No) per bit per receiving antenna, and the vertical axis represents average block error rate (BLER). The darkened circles represent the ideal estimation results by cunning calculation, and they also indicate the estimation limit. The white circles, triangles, and squares located very close to the ideal curve indicate the estimation result of the present embodiment. The square, the triangle, the cross marks, and the inverse triangle depicted in the ellipse indicate the estimation result of the conventional method.

The four symbols of the estimation result of the conventional method represent different threshold values (Eth) of path search power level. The square indicates the estimation result when the power threshold is set to a certain reference power level $P_A$ (Eth=$P_A$), the triangle indicates the estimation result with the power threshold set to three times the reference power level $P_A$ (Eth=3*$P_A$), the cross mark indicates the estimation result with the threshold set to five times the reference power level $P_A$ (Eth=5*$P_A$), and the inverse triangle indicates the estimation result with the threshold set to seven times the reference power level $P_A$ (Eth=7*$P_A$). The reference power level used in this simulation is the average power level determined by removing the 24 largest paths from the power delay profile and then averaging the power levels of the remaining paths. The estimation result is unsatisfactory when the threshold level is set too low. This is because the paths selected as exceeding the threshold include undesired paths other than the true paths. The estimation result also becomes unsatisfactory when the threshold is set too high because some true paths with power levels under the threshold fail to be selected.

The three symbols of the estimation result of the present embodiment indicate different numbers (Y) of sidelobe components to be removed. The power threshold for the path search is set to twice the reference power level (Eth=2*$P_A$). The triangle indicates the estimation result when one sidelobe component appearing on either side of the true path is removed (Y=1). The square indicates the estimation result when two sidelobe components appearing on either side of the true path are removed (Y=2). The circle indicates the estimation result when three sidelobe components appearing on either side of the true path are removed (Y=3). In either case, the estimation results are very close to the ideal curve (defined by the darkened circles), unlike the estimation result of the conventional method.

FIG. 9 is a functional block diagram of a path searcher according to another embodiment of the invention. The path searcher shown in FIG. 9 includes a power delay profile generating unit 402, N sidelobe generating units 406-n, N sidelobe removing units 407-n, and N path timing detection units 408-n (n=1, ..., $N_{all}$). Thus, the path searcher of this embodiment has $N_{all}$ path searching lines, where $N_{all}=N_{TX}*N_{RX}$, $N_{TX}$ denotes the number of transmission antennas, and $N_{RX}$ denotes the number of receiving antennas.

The power delay profile generating unit 402 performs channel estimation for each combination of a transmission antenna and a receiving antenna based on the received pilot signal, and creates $N_{TX}*N_{RX}$ power delay profiles. The $N_{TX}*N_{RX}$ combinations of the transmission antenna and receiving antenna 208 can be distinguished from each other by making use of the pilot signals being different among the multiple transmission antennas. Each of the power delay profiles is supplied to the corresponding silelobe generating unit 406 and sidelobe removing unit 407. Since the elements contained in $N_{all}$ path search lines have the same structure and the same function, explanation is made of the elements included in the first path search line.

The sidelobe generating unit 406-1 generates the sidelobe components appearing in the power delay profile, making use of the impulse response characteristic of the roll-off filter, which characteristic is expressed by Equation (1). The number of sidelobe components showing the power levels and the timings to be generated is determined depending on the use.

The sidelobe removing unit 407-1 removes the sidelobe components identified by the sidelobe generating unit 406-1 from the power delay profile produced by the power delay profile generating unit 402. The path timing detection unit 408 extracts path timings based on the power delay profile corrected by the sidelobe removing unit 407-1.

In this embodiment, the $N_{all}$ power delay profiles are not averaged, and the removal of the sidelobe components and the detection of path timings are performed for each of the power delay profiles. The path timing detection results are supplied to the signal detection unit 302 shown in FIG. 3. The signal detection unit 302 performs signal separation more accurately, as compared with the previous embodiment, based on the accurate path timings determined for each of the propagation paths differing from each other according to the combinations of transmission antenna and receiving antenna.

This patent application is based on and claims the benefit of the earlier filing dates of Japanese Patent Application No. 2004-144180 filed May 13, 2004, the entire contents of which are hereby incorporated by reference.

What is claimed is:

1. A path searcher used in a receiver comprising:
   a power delay profile generating unit configured to generate plural power delay profiles, each based on a signal received by a different antenna in a plurality of receiving antennas of the receiver;
   a path profile combining unit configured to combine the plural power delay profiles to produce a combined power delay profile;
   a sidelobe generating unit configured to generate a sidelobe component of a path contained in the combined power delay profile based on a response characteristic of a band-limiting filter of the receiver;
   a sidelobe removing unit configured to remove the sidelobe component from the power delay profile to produce a corrected power delay profile; and
   a path timing detection unit configured to detect a path timing based on the corrected power delay profile.

2. The path searcher of claim 1, wherein:
   multiple signals transmitted from multiple transmitting antennas and received at the plurality of receiving antennas of the receiver are input to the power delay profile generating unit, and the power delay profile generating unit generates the power delay profile for each combination of one of the transmitting antennas and one of the receiving antennas.

3. The path searcher of claim 2, wherein:
   the path profile combining unit is further configured to combine the power delay profiles generated corresponding to the combinations.

4. The path searcher of claim 2, wherein the sidelobe generating unit is further configured to generate the sidelobe component of the path for each of the power delay profiles generated corresponding to the combinations.

5. A receiver comprising:
   plural antennas each configured to receive a corresponding signal;
   a band-limiting filter configured to remove an unnecessary frequency component from each received signal;
   a power delay profile generating unit configured to generate plural power delay profiles, each based on the corresponding received signal;
   a path profile combining unit configured to combine the plural power delay profiles to produce a combined power delay profile;
   a sidelobe generating unit configured to generate a sidelobe component of a path contained in the combined power delay profile based on a response characteristic of the band-limiting filter;
   a sidelobe removing unit configured to remove the sidelobe component from the power delay profile to produce a corrected power delay profile; and
   a path timing detection unit configured to detect a path timing based on the corrected power delay profile.

6. The receiver of claim 5, wherein:
   each of the plurality of receiving antennas is further configured to receive signals from a plurality of transmission antennas; and
   the power delay profile generating unit generates the delay profile for each combination of one of the transmitting antennas and one of the receiving antennas.

7. The receiver of claim 6, wherein:
   the path profile combining unit is further configured to combine the power delay profiles generated corresponding to the combinations.

8. The receiver claim 6, wherein the sidelobe generating unit is further configured to generate the sidelobe component of the path for each of the power delay profiles generated corresponding to the combinations.

9. A path searching method comprising the steps of:
   generating plural power delay profiles each based on a signal received by a different antenna;
   combining the plural power delay profiles to produce a combined power delay profile;
   selecting a path exceeding a threshold from the combined power delay profile;
   identifying a sidelobe component of the selected path based on a response characteristic of a band-limiting filter;

removing the sidelobe component from the power delay profile to produce a corrected power delay profile; and detecting a path timing based on the corrected power delay profile.

10. A path searcher used in a receiver comprising:
a power delay profile generating unit configured to generate a power delay profile based on a signal received by the receiver;
a sidelobe generating unit configured to identify a sidelobe component of a path contained in the power delay profile based on a response characteristic of a band-limiting filter of the receiver;
a sidelobe removing unit configured to remove the sidelobe component from the power delay profile to produce a corrected power delay profile;
a path timing detection unit configured to detect a path timing based on the corrected power delay profile;
multiple signals transmitted from multiple transmitting antennas and received at multiple receiving antennas of the receiver are input to the power delay profile generating unit, and the power delay profile generating unit generates the power delay profile for each combination of one of the transmitting antennas and one of the receiving antennas;
the path searcher further comprises a path profile combining unit configured to combine the power delay profiles generated corresponding to the combinations; and
the sidelobe generating unit generates the sidelobe component of the path for the combined power delay profile.

11. A receiver comprising:
an antenna configured to receive a signal;
a band-limiting filter configured to remove an unnecessary frequency component from the received signal;
a power delay profile generating unit configured to generate a power delay profile based on the received signal;
a sidelobe generating unit configured to identify a sidelobe component of a path contained in the power delay profile based on a response characteristic of the band-limiting filter;
a sidelobe removing unit configured to remove the sidelobe component from the power delay profile to produce a corrected power delay profile;
a path timing detection unit configured to detect a path timing based on the corrected power delay profile;
the antenna includes a plurality of receiving antennas, each receiving antenna configured to receive signals from a plurality of transmission antennas, and the power delay profile generating unit generates the delay profile for each combination of one of the transmitting antennas and one of the receiving antennas;
the receiver further comprises a path profile combining unit configured to combine the power delay profiles generated corresponding to the combinations; and
the sidelobe generating unit generates the sidelobe component of the path for the combined power delay profile.

* * * * *